Figure 1:
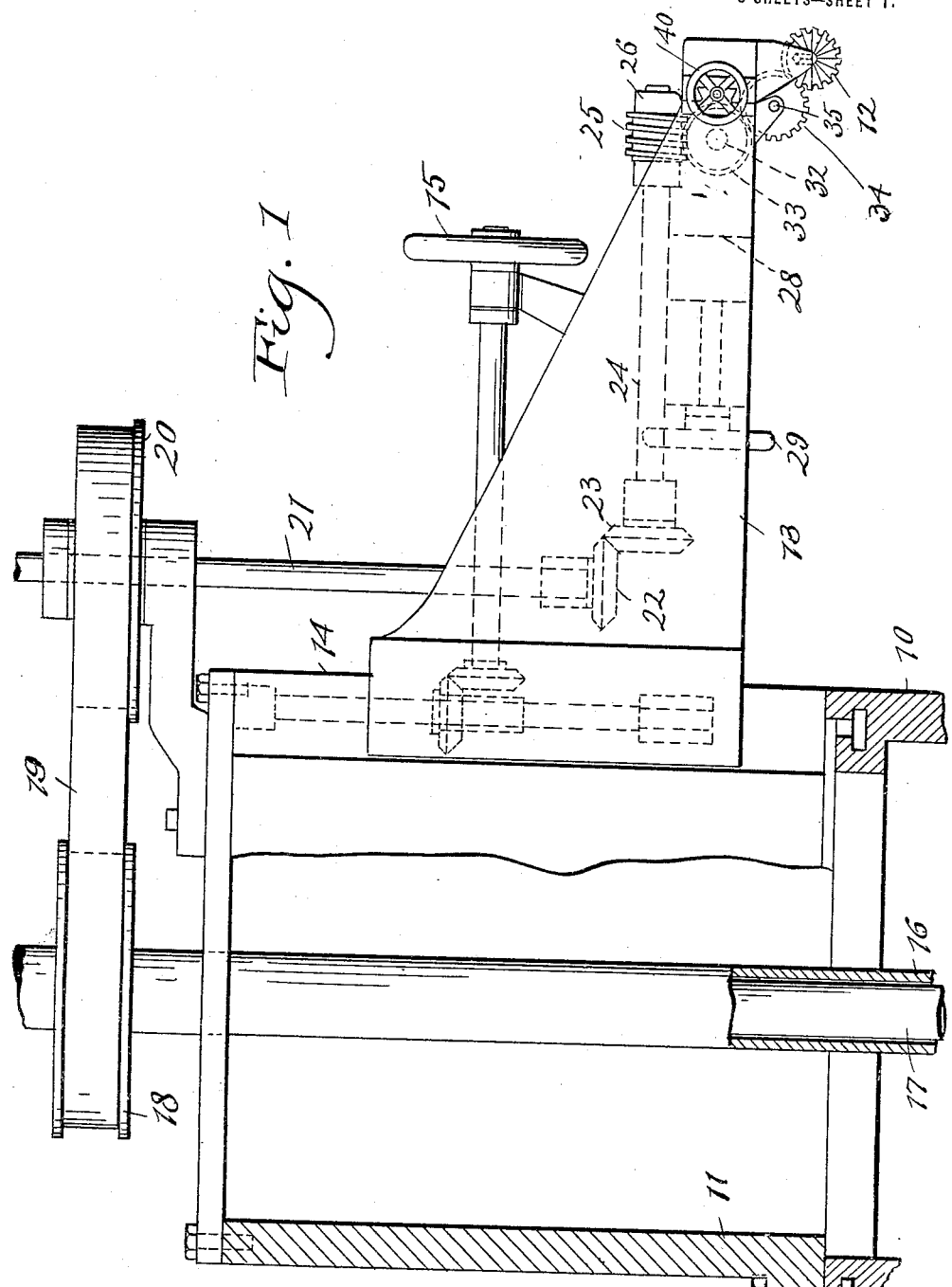

A. ARTHUR.
MILLING MACHINE.
APPLICATION FILED MAR. 11, 1918.

1,330,971.

Patented Feb. 17, 1920.
3 SHEETS—SHEET 1.

Inventor: Albert Arthur
by Thurston & Kwis Attys

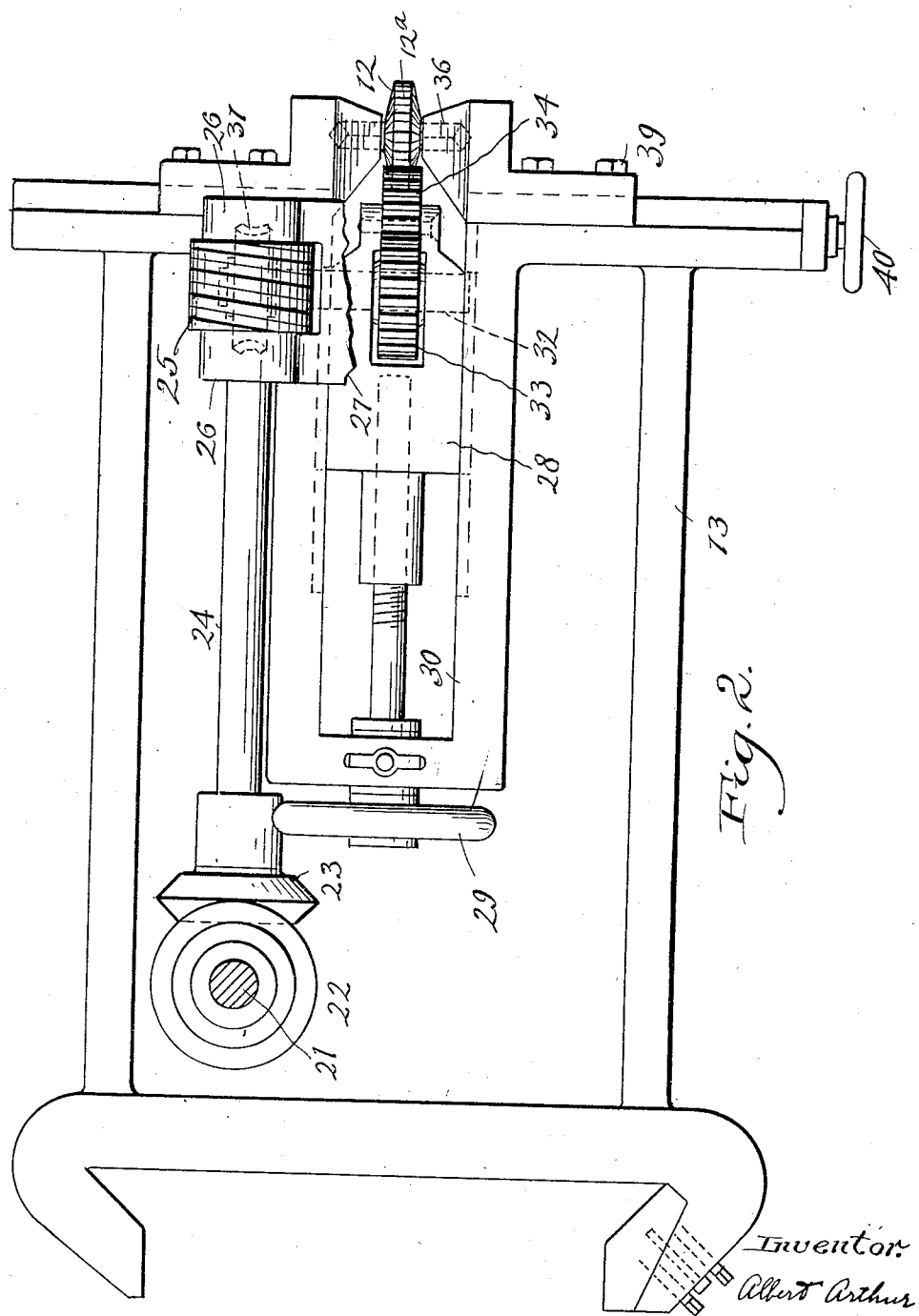

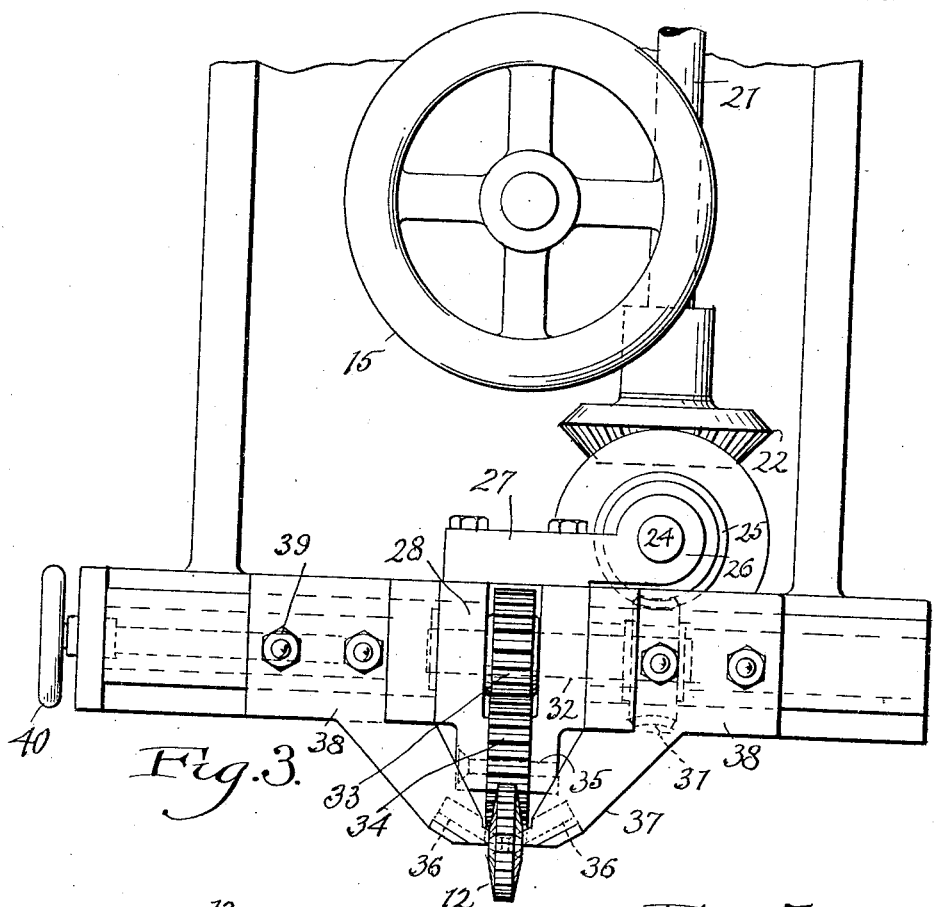
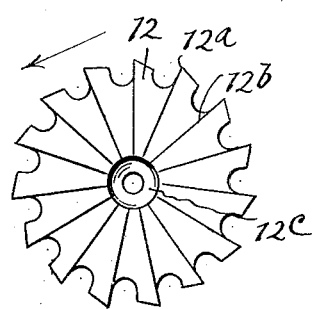
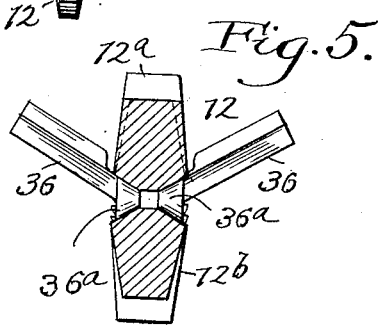

UNITED STATES PATENT OFFICE.

ALBERT ARTHUR, OF CLEVELAND, OHIO.

MILLING-MACHINE.

1,330,971. Specification of Letters Patent. Patented Feb. 17, 1920.

Original application filed August 20, 1915, Serial No. 46,500. Divided and this applicaton filed March 11, 1918. Serial No. 221,647.

*To all whom it may concern:*

Be it known that I, ALBERT ARTHUR, a citizen of the United States, residing at Cleveland, in the county of Cuyahoga and State of Ohio, have invented a certain new and useful Improvement in Milling - Machines, of which the following is a full, clear, and exact description.

This invention relates to certain improvements in milling machines, such as die sinking machines, and this application is a division of my prior application original Serial No. 46,500, filed August 20, 1915, renewed June 11, 1917, renewal Serial No. 174,164.

In my prior or parent application above referred to, I disclose a die sinking machine or milling machine of the turret type, having two cutters, either of which can be brought to cutting position with respect to the work supported in the chuck or work holder, the two cutters being preferably in the nature of a roughing out and finishing cutter, respectively.

The cutter to which the claims of my parent application are devoted particularly, is designed to be mounted on the lower end of a vertically rotating spindle, which is so mounted and actuated that as the spindle is lowered it can be caused to travel laterally in such a manner that the point of the cutter will be caused to travel in an arc of a circle rather than in a straight vertical line.

The second cutter which with its associated mechanism constitutes the subject matter of this application, is a rotating cutter, preferably provided with peripheral and lateral cutting edges, this cutter being preferably driven through a gear or pinion engaging the peripheral cutting teeth or edges, and being mounted and driven so that it will do very effective work, and can be inserted well down into the recess of a die block, the mounting of the cutter being such that the workman can observe the cutting action without having his view materially obstructed by the part or parts which support or actuate the cutter.

The invention may be briefly summarized as consisting in certain novel details of construction and combinations and arrangements of parts which will be described in the specification and set forth in the appended claims.

In the accompanying sheets of drawings, Figure 1 is a side elevation with parts in section of so much of the machine of the prior application as is necessary to give a clear understanding of the present invention; Fig. 2 is a top plan view of the vertically adjustable arm which carries the cutter and the major portion of the driving mechanism; Fig. 3 is a view of the cutter and associated mechanism looking toward the left of Fig. 1; Fig. 4 is a side view of the cutter removed; and Fig. 5 is a sectional view of the cutter showing the tapered or inclined supporting centers.

Referring now to the drawings, 10 represents a supporting column similar to that of my parent application, this column having a rotary upper portion 11 which is designed to carry the cutters and may be turned relatively to the base to present either cutter to the work. In this case I have shown only the cutter which is involved in this invention, this cutter being shown at 12, and being provided with peripheral cutting and driving teeth $12^a$ (see particularly Figs. 4 and 5), and laterally cutting edges or teeth $12^b$. This cutter with its associated driving and supporting parts is carried by an arm 13 which is mounted for vertical movement along a guideway 14 of the upper part 11 of the column and may be adjusted vertically through the medium of a hand wheel 15. While the specific driving mechanism here shown is not essential to my invention, particularly that part of the driving mechanism which delivers power to the gears which directly drive the cutter, I have shown in this case, the same driving method which is disclosed in my parent application. This method involves the use of a hollow driving shaft 16, and an inner solid driving shaft 17 extending centrally through the column, the former being designed to drive the cutter 12, and the latter to drive the spindle of the other cutter which is specifically claimed in my parent application.

In this instance, the hollow shaft 16 is provided with a pulley 18, from which power is transmitted by a belt 19 laterally to a pulley 20 carried by a vertical shaft 21. This shaft is provided at its lower end with a bevel gear 22 which meshes with a bevel gear 23 fixed to a shaft 24 which is carried by the laterally extending cutter supporting arm 13. This shaft 24 drives a worm gear 25 which is connected to the shaft by a feather by which it may be moved lengthwise of the shaft, but will be rotated by the latter. This worm gear 25 is located between two bearings 26 on an arm 27 (see Fig. 3) which is secured to a sliding block 28 adjustable inwardly and outwardly, or toward and from the column by a hand wheel 29, the block being movable in a guideway 30 rigidly supported by, and in fact, forming a part of the arm 13.

The worm 25 drives a worm gear 31 fixed to a shaft 32 shown by dotted lines in Figs. 1, 2 and 3, this shaft being mounted in the sliding block 28 and being provided with a gear 33 which is in the plane of the cutter 12, but above and at the rear of the same. This gear 33 drives a gear 34 which is located diagonally downward and forward of the gear 33, and is supported on a pin or shaft 35, likewise carried by the block 28. The teeth of the gear 34 engage the peripheral cutting teeth 12$^a$ of the cutter 12 and thus drive the latter. It will be noted that the cutter is beneath and forward of the driving gear 34, and that the application of the drive is not diametrically opposite the lower part of the cutter where the cutting is done when a recess is being cut in a die block.

The cutter 12 is provided on opposite sides with conical bearing openings 12$^c$, and it is supported in working position and in driving relation with the gear 34 by two centers 36 which are not axially arranged with respect to the cutter but extend downwardly and inwardly toward the same as best shown in Fig. 5, and at their inner ends having conical bearing portions 36$^a$. These centers are supported in two arms 37 which project downwardly from, and are integral with a pair of sliding blocks 38 which are mounted in guideways on the front of the arm 13, and may be moved back and forth toward and from each other to vary the distance between them so as to accommodate cutters of different widths. These blocks may be clamped in any adjusted position by clamping bolts 39, which will be loosened when it is desired to shift the blocks 38, and will be tightened when the blocks are the right distance apart. One of the blocks 38 is here shown adjustable through the medium of a hand wheel 40 which may, however, be omitted, or one of which may be provided for each block if desired.

This mounting of the cutter while an advantage in various types of milling machines is especially advantageous in a milling machine used for die sinking purposes for not only is the cutter wholly beneath the supporting arm 13, but the diagonal supporting arms 37 and the diagonal centers 36 allow the cutter to be lowered or to cut its way a considerable distance into the recess of a die block, and the operator can by looking down from the side of the cutter observe the cutting action without having his view obstructed to an undesirable extent by the cutter supporting devices. This also is of particular utility in die sinking where the cutter is obliged to work in a recess of a die block, The cutter can be raised and lowered by turning the hand wheel 15, and if it is desired to change the cutter, substituting one which is wider or of greater diameter, this is possible for the reason that the blocks supporting the centers 38 can be moved toward and from each other, and the block carrying the driving gears 33 and 34 can be moved inward and outward by adjusting the hand wheel 29 to vary the distance between the axis of the cutter and the axis of the gear 34 which directly drives the cutter.

Not only is the cutter mounted so that effective work can be done in the recess of a die block with the cutter cutting deeply and without the view of the operator being seriously obstructed, but a further advantage resides in the way that the cutter is driven. Assuming that the lower part of the cutter is the cutting part, the point of application of power, or the turning effort on the cutter is not diametrically opposite the cutting part, but is to the rear and above the latter. In consequence of this there does not exist the possibility of breakage of the cutter or destruction of the cutter mounting that would exist if the turning effort were applied diametrically opposite from the cutting portion, when the greatest possible leverage is exerted on the cutting part with a tendency to cause the cutter to ride up on, or force itself over the work.

It will be understood that certain changes can be made in details of construction and arrangement, and I therefore do not desire to be confined to the precise details shown, but aim in my claims to cover all modifications which do not involve a departure from the spirit and scope of my invention in its broadest aspects.

Having described my invention, I claim:

1. In a machine of the character described, a cutter supporting arm, a cutter carried by and extending beneath the arm, and a mounting carried by said arm, said mounting including a pair of centers about the inner ends of which the cutter rotates and provided with diagonally disposed supporting shanks, means carried by the arm engaging the diagonally disposed portions of the centers, and means for driving said cutter.

2. In a machine of the character described, a cutter supporting member, a cutter having peripheral teeth, a mounting for the cutter by which the cutter is supported beneath said supporting member, said mounting comprising arms projecting downwardly from said supporting member and provided with diagonally disposed center receiving portions, and a pair of diagonally disposed, downwardly inclined centers having their inner ends rotatably supporting said cutter and carried by said portions of the arms, and means for driving the cutter.

3. In a machine of the character described, a cutter supporting arm, a pair of blocks at the outer end of the arm and movable toward and from each other, said blocks having diagonally disposed center receiving portions, a pair of downwardly inclined, diagonally disposed centers supported by said portions of the blocks, and a cutter rotatably supported on the inner ends of said centers.

4. In a machine of the character described, a cutter supporting arm, a pair of blocks at the outer end of the arm and movable toward and from each other, said blocks having downwardly and inwardly projecting lower ends, a pair of centers supported by the lower ends of said blocks, a cutter rotatably supported on the inner ends of said centers, said cutter having peripheral teeth, and a gear carried by said arm and engaging said teeth to drive the cutter.

5. In a machine of the character described, a cutter supporting arm, a pair of blocks at the outer end of said arm movable toward and from each other, arms projecting downwardly and inwardly from said blocks, a pair of centers supported by the lower portions of said arms, a cutter having peripheral teeth supported on the inner lower ends of said centers, and a gear engaging said peripheral teeth to drive the same.

6. In a machine of the character described, a cutter support, a cutter supported from said support beneath the same, said support having downwardly inclined centers with tapered inner ends engaged by the cutter, said cutter having peripheral cutting and driving teeth, and a gear carried by said support in driving relationship with the teeth of the cutter, said gear having its axis above and to the rear of the axis of the cutter.

7. In a machine of the character described, a cutter supporting arm, a rotary cutter having peripheral driving and cutting teeth supported at the front of and beneath said arm, a gear for driving said cutter in driving relationship with the peripheral teeth of the cutter, the axis of said gear being to the rear and above the axis of the cutter, and means whereby said gear may be moved toward and from the axis of the cutter.

8. In a machine of the character described, a cutter supporting arm, a cutter having peripheral driving and cutting teeth supported at the lower front end of the arm, a block slidable back and forth along said arm, and gears for driving the cutter carried by said block.

9. In a machine of the character described, a cutter supporting arm, a cutter having peripheral driving and cutting teeth supported at the lower front end of the arm, a block slidable back and forth along said arm, and gears for driving the cutter carried by said block, one of said gears being in driving relationship with the peripheral teeth of the cutter and having its axis above and to the rear of the axis of the cutter.

In testimony whereof I hereunto affix my signature.

ALBERT ARTHUR.